United States Patent [19]
Shimamori

[11] Patent Number: 5,932,938
[45] Date of Patent: Aug. 3, 1999

[54] SWITCHING POWER SUPPLY UNIT

[75] Inventor: Hiroshi Shimamori, Kanagawa, Japan

[73] Assignee: Fujitsu Limited, Kawasaki, Japan

[21] Appl. No.: 09/046,678

[22] Filed: Mar. 24, 1998

[30] Foreign Application Priority Data

Oct. 2, 1997 [JP] Japan ................................ 9-270056

[51] Int. Cl.$^6$ .................................................. H02M 3/02
[52] U.S. Cl. ........................ 307/125; 323/241; 323/246; 323/265; 323/275; 323/282
[58] Field of Search .............................. 307/125; 323/265, 323/275, 283, 241, 246, 284, 282, 351; 395/750.01

[56] References Cited

U.S. PATENT DOCUMENTS

| | | | |
|---|---|---|---|
| 4,563,733 | 1/1986 | Schlenk ................................ | 323/282 |
| 4,954,767 | 9/1990 | Buisson et al. ....................... | 323/282 |
| 5,345,376 | 9/1994 | Nourbakhsh .......................... | 323/351 |
| 5,530,879 | 6/1996 | Crump et al. ........................ | 395/750.01 |
| 5,621,629 | 4/1997 | Hemminger et al. .................. | 363/56 |

FOREIGN PATENT DOCUMENTS 2-131358  5/1990  Japan .

*Primary Examiner*—Albert W. Paladini
*Attorney, Agent, or Firm*—Staas & Halsey

[57] ABSTRACT

A switching power supply unit controls an output voltage of a power supply without monitoring an output voltage. The switching power supply unit includes a pulse width modulator for generating a control signal to turn on and off a switching transistor. A central processing unit outputs a modulation signal to control the pulse width modulator while sensors detect an input voltage, an output current and a peripheral temperature. A table is used by the central processing unit to store information about a relation between the detected values from the sensors and an ON time of the switching transistor. The central processing unit then selects an ON time of the switching transistor from the table according to values detected by the respective sensors to thereby provide control for switching the switching transistor on and off. The switching transistor is switched according to the selected time and to thereby switch an input voltage in response to changes of an input voltage, an output current and a peripheral temperature without monitoring an output voltage. Furthermore, the output voltage can be maintained with stability at a desired output voltage.

45 Claims, 11 Drawing Sheets

FIG.2

PERIPHERAL TEMPERATURE Ta=25°C

| Iout (A) Vin (V) | 0 | 0.1 | 0.2 | - - - | 9.7 | 9.8 | 9.9 | 10.0 |
|---|---|---|---|---|---|---|---|---|
| 8.00 | 0.650 | 0.651 | 0.652 | | 0.897 | 0.898 | 0.899 | 0.900 |
| 8.10 | 0.648 | 0.649 | 0.649 | | 0.895 | 0.896 | 0.897 | 0.898 |
| 8.20 | 0.646 | 0.647 | 0.647 | | 0.893 | 0.894 | 0.895 | 0.896 |
| - - - | — | — | — | | — | — | — | — |
| 11.7 | 0.436 | 0.437 | 0.437 | | 0.503 | 0.504 | 0.505 | 0.506 |
| 11.8 | 0.434 | 0.435 | 0.435 | | 0.501 | 0.502 | 0.503 | 0.504 |
| 11.9 | 0.432 | 0.433 | 0.433 | | 0.499 | 0.500 | 0.501 | 0.502 |
| 12.0 | 0.430 | 0.431 | 0.431 | | 0.497 | 0.498 | 0.499 | 0.500 |

48

SWITCHING POWER SUPPLY UNIT

FIELD OF THE INVENTION

The present invention relates to a switching power supply unit, and more particularly to a power supply unit in a digital control system for controlling an output voltage to a specified value by referring to a table. The table stores information concerning a relation between an input voltage (Vin), an output current (Iout) and a peripheral temperature (Ta) and an ON time or an OFF time of a switching element.

BACKGROUND OF THE INVENTION

FIG. 10 shows a configuration of a conventional type of switching power supply unit. As shown in the figure, this switching power supply unit 1 converts an input voltage from an externally connected input power supply 21 to a desired voltage by switching ON/OFF a switching transistor (Q1) 11, filters the voltage with a choke coil (L1) 12 for filtering as well as with a capacitor (C1) 13 to be outputted to outside, and supplies a specified voltage to a load 22 such as a main body of an externally connected computer. Then, a feedback control is executed in this switching power supply unit 1 so that an output voltage is a constant value.

Namely, an error voltage detecting amplifier 14 and a pulse width modulator (PWM1) 15 are provided in this switching power supply unit 1, the error voltage detecting amplifier 14 generates an error signal according to a difference between an output voltage (Vout) from the switching power supply unit 1 and a preset reference voltage (Vref), and the pulse width modulator (PWM1) 15 generates a control signal having a pulse width corresponding to an ON time of the switching transistor 11 (according to the error signal as a modulation signal) and provides controls for turning ON/OFF the switching transistor 11 via a buffer 16. In the figure, designated at the reference numeral 17 is a diode for regeneration, at 18a, 18b an input terminal, and at 19a, 19b an output terminal respectively.

A switching power supply unit disclosed in Japanese Patent Laid-Open Publication No. HEI 2-131358 controls operations of a switching transistor by comparing binary information for an output voltage as a reference to binary information for an actual output voltage.

In the switching power supply unit based on the conventional technology, however, feedback control is executed to turn ON/OFF the switching transistor according to an actual output voltage from the power supply unit, and for this reason, for instance, when an actual output voltage is displaced from the reference voltage due to fluctuation of an output current as shown in FIG. 11, a long time is required for changing of a pulse width of a pulse signal controlling ON/OFF of the switching transistor according to the feedback control in accordance with the displacement, and also a long time is required for an actual output voltage to match the reference voltage, which indicates that controllability is not sufficient.

Especially, when a load device connected to a power supply unit comprises a CMOS circuit as is the case in recent years, a current flows in the load only when the CMOS circuit operates, so that an output current is largely changed, accordingly an output voltage is also largely fluctuated, and control of an output voltage by means of the feedback control does not effectively function.

Also, in the switching power supply unit having the configuration shown in FIG. 10, a phase is delayed by 180° in a filter circuit comprising L1 and C1, and further a delay of a phase by the error detecting amplifier 14 is added thereto. To prevent occurrence of a phenomenon known as a feedback loop, which is generated if a gain is 0 dB or more at a point of time when the phase has been delayed by 180°, the high frequency characteristic of the error detecting amplifier 14 has to be lowered in the switching power supply unit having the configuration shown in FIG. 10, which makes it impossible to realize a rapid response. Also to maintain stability of the feedback loop, the gain of the error detecting amplifier 14 is lowered from a low frequency, and for this reason, fluctuation of an output voltage to a change of an input voltage as well as of an output current becomes in turn large, and to deal with the fluctuation, a large number of capacitors have to be provided in the output side of the power supply unit, which causes the unit to be upsized.

SUMMARY OF THE INVENTION

It is an object of the present invention to provide a small-sized switching power supply unit enabling a rapid response.

With the present invention, by referring to an input voltage detected by an input voltage detecting unit as well as to a previously prepared table, an ON time or an OFF time of a switching unit corresponding to the detected input voltage is univocally decided.

In addition, a feedback loop is not required to be provided therein.

With the present invention, by referring to an output current detected by an output current detecting unit as well as to the previously prepared table, an ON time or an OFF time of a switching unit corresponding to the detected output current is univocally decided.

In addition, a feedback loop is not required to be provided therein.

With the present invention, by referring to an input voltage detected by the input voltage detecting unit, an output current detected by the output current detecting unit and to the previously prepared table, an ON time or an OFF time of a switching unit corresponding to the detected input voltage as well as output current is univocally decided.

In addition, a feedback loop is not required to be provided therein.

With the present invention, by referring to an input voltage detected by the input voltage detecting unit, an output current detected by the output current detecting unit, a peripheral temperature detected by a peripheral temperature detecting unit and to the previously prepared table, an ON time or an OFF time of a switching unit corresponding to the detected input voltage, output current and peripheral temperature is univocally decided.

With the present invention, the table can be updated by comparing an actual output voltage value at an output terminal of the power supply unit detected by the output voltage detecting unit to a reference voltage value.

With the present invention, the table can be updated including a value for a attenuated voltage due to a wiring or the like from the output terminal of the power supply unit to an external load by comparing an actual output voltage value at an input terminal of the external load detected by the output voltage detecting unit to the reference voltage value.

With the present invention, the table can be updated once for every specified period of time.

With the present invention, a switching unit can be controlled with a value obtained by correcting the value stored in the table by using the original table stored in a read-only memory as well as a corrected table.

With the present invention, the switching unit can be controlled by using the latest table always updated.

With the present invention, an input voltage is switched according by turning ON/OFF a switching transistor.

With the present invention, processing for selecting the corresponding ON time or OFF time from the table is executed by a processing unit, and a pulse signal for controlling the switching unit is generated by a pulse generating unit according to the selected ON time or OFF time.

With the present invention, a switching operation of the switching unit is controlled by changing a pulse width of a pulse signal.

With the present invention, a switching operation of the switching unit is controlled by changing a frequency of a pulse signal.

With the present invention, a table can automatically be prepared by an external control unit.

Other objects and features of this invention will become understood from the following description with reference to the accompanying drawings.

BRIEF DESCRIPTION OF THE DRAWINGS

FIG. 2 is an explanatory view for explaining one example of the table for the switching power supply unit according to the present invention;

DESCRIPTION OF THE PREFERRED EMBODIMENTS

Detailed description is made hereinafter for preferred embodiments of the switching power supply unit according to the present invention with reference to the related drawings.

Figure 1:
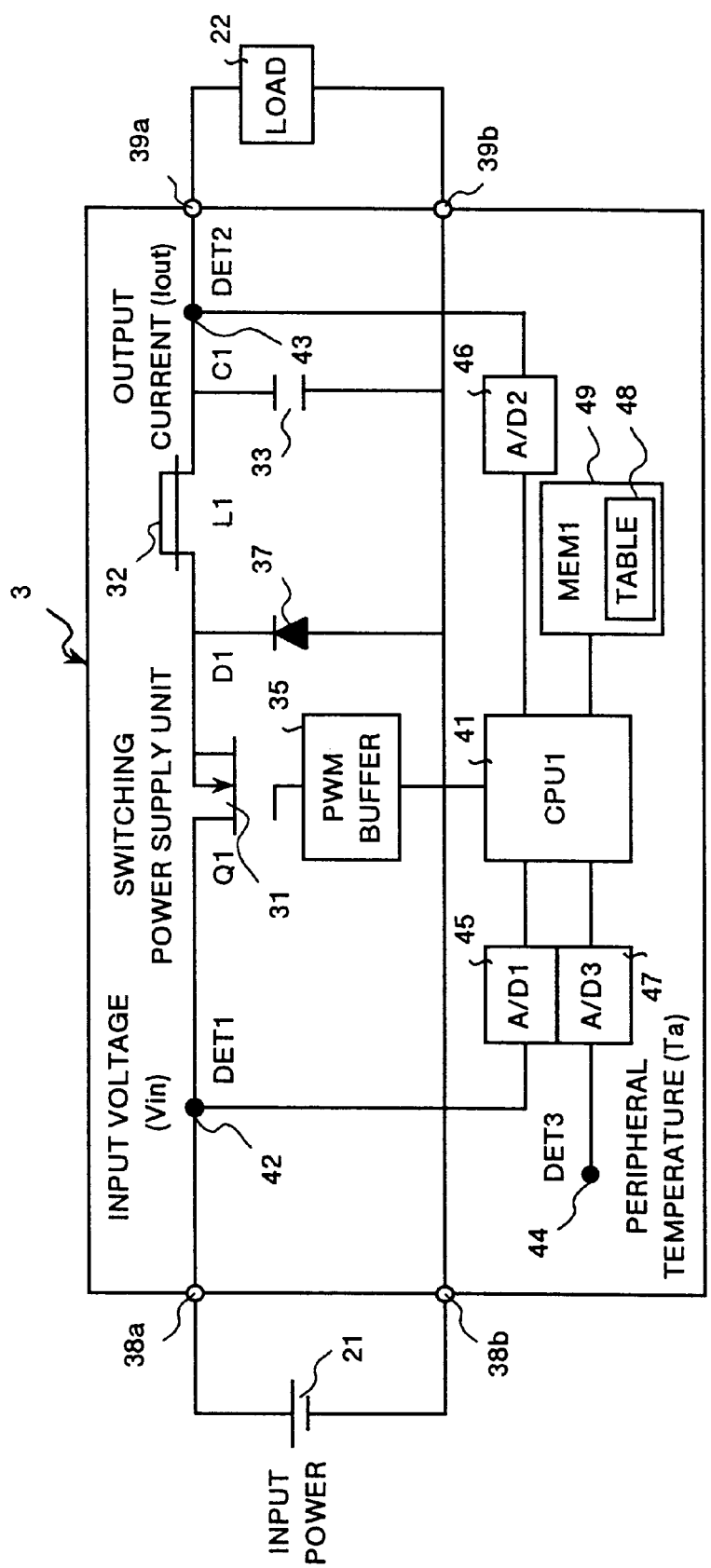
FIG. 1 is a block diagram showing Embodiment 1 of the switching power supply unit according to the present invention.

FIG. 1 shows a configuration of the switching power supply unit according to the present invention. As shown in the figure, this switching power supply unit 3 comprises input terminals 38a, 38b connected to an input power supply unit 21, output terminals 39a, 39b connected to an external load 22, a switching transistor (Q1) 31 for switching an input voltage, a pulse width modulator (PWM1) 35 for generating a control signal to turn ON/OFF the switching transistor 31 and outputting the generated signal to the switching transistor 31, and a central processing unit (CPU1) 41 for outputting a modulation signal to the pulse width modulator 35.

The switching power supply unit 3 further comprises a voltage sensor (DET1) 42 for detecting a voltage value of an input voltage (Vin) inputted into the power supply unit 3; a current sensor (DET2) 43 for detecting a current value (Iout) of an output current outputted from the power supply unit 3; a temperature sensor (DET3) 44 for detecting a temperature (Ta) of an atmosphere in a place where the power supply unit 3 is located; first, second, and third analog to digital converters (A/D1, A/D2, A/D3) 45, 46, 47 for converting values (analog values) detected by the voltage sensor 42, current sensor 43 and by the temperature sensor 44 to digital values respectively; a memory (MEM1) 49 for storing therein a table (TABLE) 48 with information concerning a relation between the values detected by the sensors 42, 43, 44 and the ON time of the switching transistor 31 stored therein as well as a program executed by the central processing unit 41; a diode 37 for regeneration; a choke coil (L1) 32 constituting a filter circuit; and a capacitor (C1) 33.

In this switching power supply unit 3, the central processing unit 41 selects a value (which is preset in connection with a combination of each detected value) corresponding to an ON time of the switching transistor 31 from the table 48 in the memory 49 according to each of the values detected by the voltage sensor 42, current sensor 43 and temperature sensor 44, generates a modulation signal according to a value of the selected ON time, and outputs the generated signal to the pulse width modulator (PWM1) 35. The pulse width modulator (PWM1) 35 generates a signal having a desired pulse width according to the modulation signal sent from the central processing unit 41 and turns ON or OFF the switching transistor 31 therewith. With those operations, switching for an input voltage is controlled in response to a change in an input voltage, an output current, or a peripheral temperature, so that an output voltage can be maintained with stability at a desired voltage value.

Of the components described above, the switching transistor (Q1) 31 has a function as a switching unit, the pulse width modulator (PWM1) 35 has a function as a pulse generating unit, and the central processing unit (CPU1) 41 has a function as a processing unit, and the control unit comprises the pulse width modulator (PWM1) 35 and the central processing unit (CPU1) 41, while the voltage sensor (DET1) 42, current sensor (DET2) 43 and temperature sensor (DET3) 44 have functions as an input voltage detecting unit, an output current detecting unit, and a peripheral temperature detecting unit respectively, and the memory (MEM1) 49 has a function as a storing unit.

FIG. 2 shows one example of contents of the table 48. The example shown in FIG. 2 is one example of the table, for example, when the peripheral temperature (Ta) is 25° C., in which the input voltage (Vin) is set from 8.00 V to 12.0 V in 0.1 V intervals and the output current (Iout) is set from 0 A to 10.0 A in 0.1 A intervals. The value in each column in the table 48 is a ratio (time ratio) of an ON time to specified cycles of ON/OFF signals supplied to, for instance, the switching transistor 31. Each value of those time ratios is actually stored in a storing element identified by a specified address in the memory 49. It should be noted that tables similar to that as described above are also prepared for a peripheral temperature other than that of 25° C., for instance, in 0.1° C. intervals.

Assuming that a peripheral temperature (Ta) at a certain point of time is 25° C., an input voltage (Vin) is 11.9 V and an output current (Iout) is 9.8 A, the time ratio of ON/OFF signals for the switching transistor 31 at that time is 0.500 according to the table 48 shown in FIG. 2. Then, if the input voltage (Vin) drops to 8.20 V for some reason though the peripheral temperature (Ta) and the output current (Iout) are the same as described above, it is understood that the time ratio of the ON/OFF signals for switching transistor 31 may be changed to 0.894 according to the table in FIG. 2.

Also, assuming that a peripheral temperature (Ta), an input voltage (vin) and an output current (Iout) are 25° C., 11.9 V and 9.8 A respectively and the time ratio at that point of time is 0.500, and if the output current (Iout) is changed to 0.2 A though the peripheral temperature (Ta) and the input voltage (Vin) are the same as described above, it is understood that the time ratio may be changed to 0.433 according to the table in FIG. 2.

Also, assuming that a peripheral temperature (Ta), an input voltage (Vin) and an output current (Iout) are 25° C., 11.9 V and 9.8 A respectively and the time ratio at that point of time is 0.500, and if the input voltage (Vin) and the output current (Iout) are changed to 8.20 V and to 0.2 A respectively though the peripheral temperature (Ta) is the same as described above, it is understood that the time ratio may be changed to 0.647 according to the table in FIG. 2.

Similarly, if the peripheral temperature (Ta) is changed, any time ratio corresponding to each of values for an input voltage (Vin) as well as for an output current (Iout) may be selected by referring to any of tables concerning other temperatures which are not shown in the figure.

Figure 3:
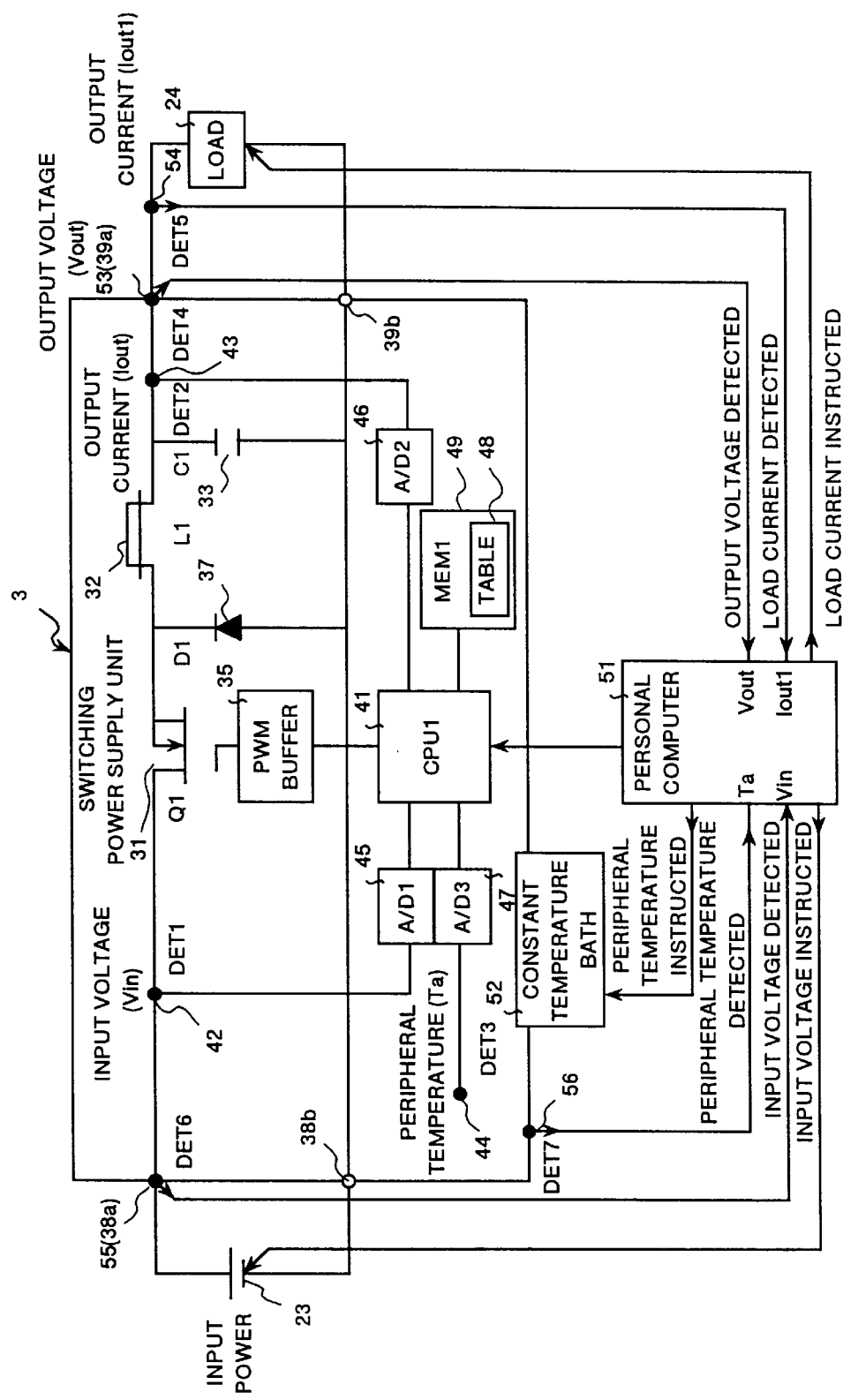
FIG. 3 is a block diagram showing a table preparing system in Embodiment 1 of the switching power supply unit according to the present invention.

FIG. 3 shows one example of a system for preparing the table 48 for the switching power supply unit 3. In this table preparing system, a unit such as a personal computer 51 as an external control unit is connected to the central processing unit 41 in the power supply unit 3, an external input power supply unit 23 which can arbitrarily control a voltage value (input voltage Vin) of a voltage supplied to the power supply unit 3 is connected to the input terminals 38a, 38b for the power supply unit 3, an external load 24 which can arbitrarily control a current value (output current Iout1) of a current outputted from the power supply unit 3 is connected to the output terminals 39a, 39b for the power supply unit 3, and further the power supply unit 3 is installed inside a constant temperature bath 52 which can control a peripheral temperature of the power supply unit 3 to an arbitrary temperature. The output current (Iout1) herein is a load current flowing through the external load 24, so that it is described hereinafter as a load current (Iout1).

A voltage sensor (DET4) 53 for detecting an output voltage (Vout) for the power supply unit 3 is provided at the output terminal 39a for the switching power supply unit 3. A current sensor (DET5) 54 for detecting a load current (Iout1) flowing through the external load 24 is provided at the input terminal for the external load 24. Also, a voltage sensor (DET6) 55 for detecting an input voltage (Vin) inputted to the power supply unit 3 is provided at the input terminal 38a for the switching power supply unit 3. The voltage sensor (DET1) 42 may be substituted for this voltage sensor (DET6) 55. Further, a temperature sensor (DET7) 56 for detecting a peripheral temperature of the switching power supply unit 3 is also provided therein. The temperature sensor (DET3) 44 provided in the power supply unit 3 may also be substituted for this temperature sensor (DET7) 56.

Inputted in the personal computer 51 is each of detected values for an input voltage (Vin), an output voltage (Vout) for the switching power supply unit 3, a load current (Iout1) flowing through the external load 24, and for a peripheral temperature (Ta) via an analog to digital converter (not shown in the figure). The personal computer 51 instructs an input voltage value, a load current value and a set value for a peripheral temperature to the external input power supply unit 23, external load 24 and the constant temperature bath 52. The external input power supply unit 23, external load 24 and the constant temperature bath 52 set an input voltage, a load current and a peripheral temperature according to instructions for set values respectively sent from the personal computer 51.

Figure 4:
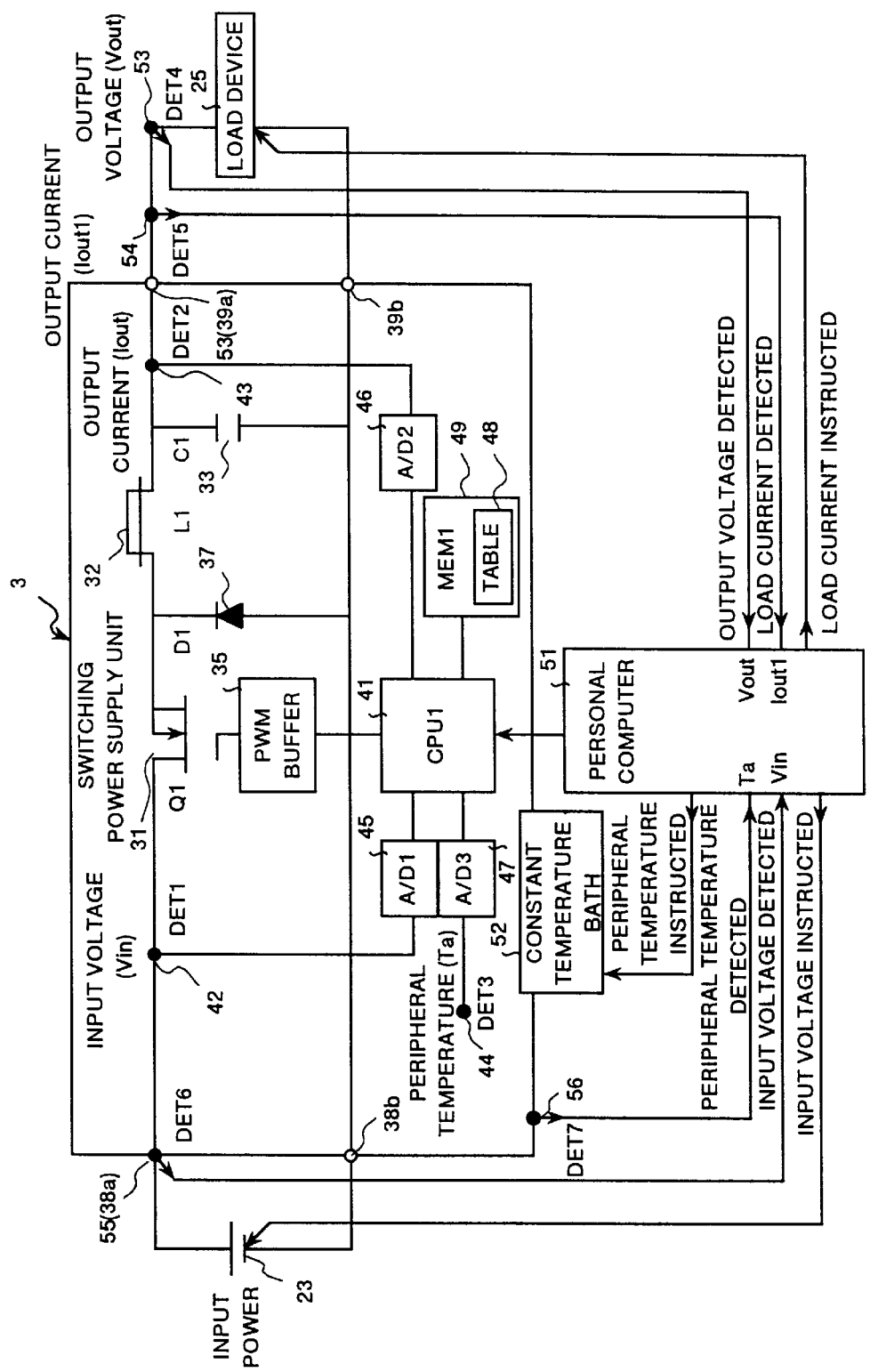
FIG. 4 is a block diagram showing other example of the table preparing system for the switching power supply unit according to the present invention.

FIG. 4 shows other example of the table preparing system. The table preparing system shown in FIG. 4 has some points different from that shown in FIG. 3 in which an actual load device 25 such as a notebook personal computer in place of the simple load 24 (Refer to FIG. 3) is connected to the output terminals 39a, 39b for the switching power supply unit 3 and also the voltage sensor (DET4) 53 provided at the output terminal 39a for the switching power supply unit 3 in FIG. 3 is provided at the input terminal for the load device 25 so that a value for a voltage drop due to a wiring or the like between the power supply unit 3 and the load device 25 can be compensated. Some other configuration is the same as that of the system shown in FIG. 3, so that description thereof is omitted herein.

Figure 5:
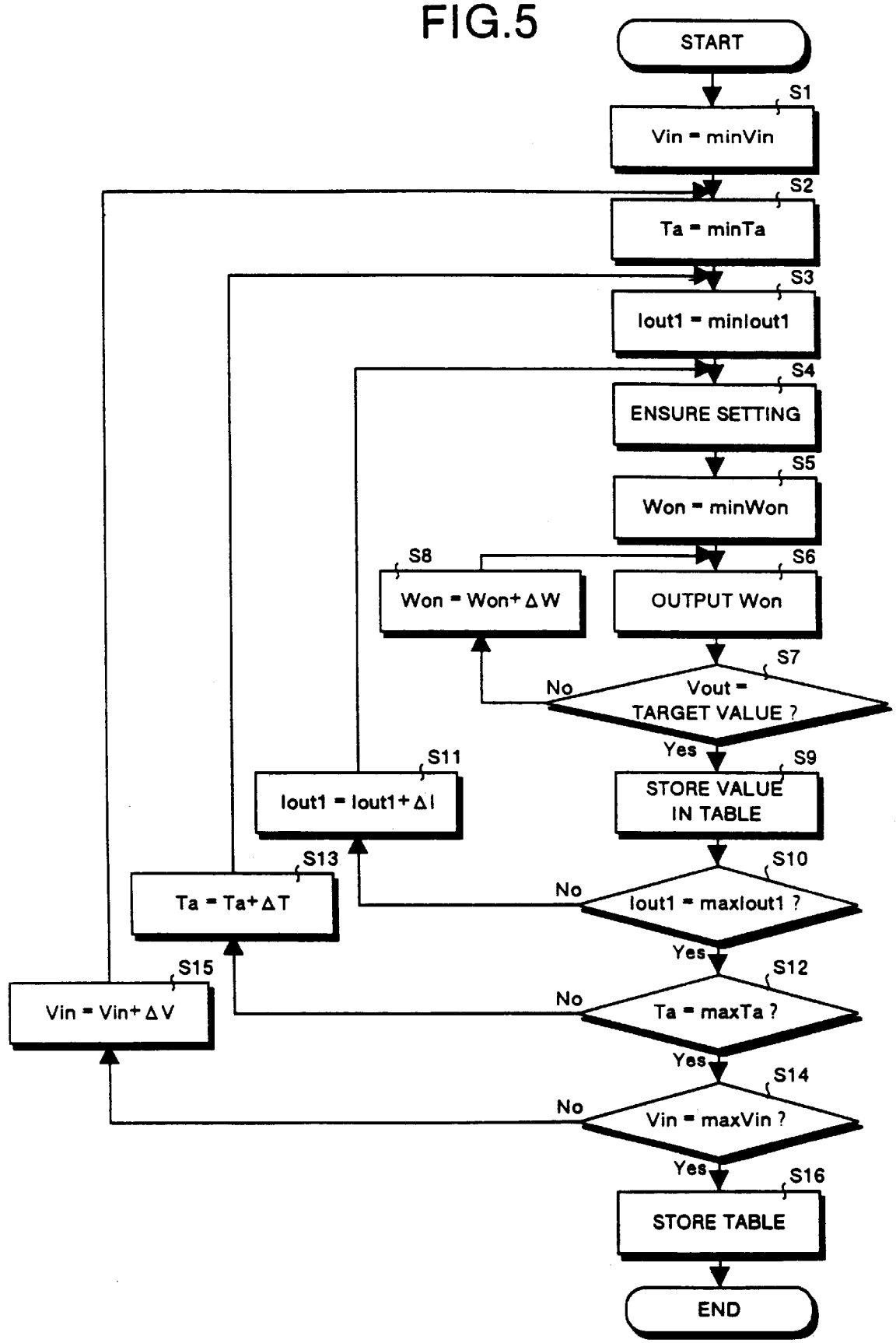
FIG. 5 is a flow chart showing one example of a table preparing method for the switching power supply unit according to the present invention.

Description is made for a flow of table preparation processing using the table preparing system shown in FIG. 3 or FIG. 4 with reference to FIG. 5. At first, when the program for processing table preparation is read out from a storing device, not shown in the figure, in the personal computer 51 for activation, the personal computer 51 sends an instruction to the external input power supply unit 23 so as to output, for example, a minimum value (min Vin) of an input voltage (Vin) (step S1). The personal computer 51 also sends an instruction to the constant temperature bath 52 so as to output, for example, a minimum value (min Ta) of a peripheral temperature (Ta) (step S2). The personal computer 51 also sends an instruction to the external load 24 or the external load device 25 so as to output, for example, a minimum value (min Iout1) of a load current (Iout1) (step S3).

Then, the personal computer 51 reads in an input voltage (Vin), a peripheral temperature (Ta) and a load current (Iout1) from the voltage sensor (DET6) 55, temperature sensor (DET7) 56 and the current sensor (DET5) 54 respectively, and ensures that those detected values coincide with the values instructed in step S1 to step S3 (step S4).

Then, the personal computer 51 sets a width for an ON width (Won) of a pulse signal, for example, to a minimum value so that the ON time of the switching transistor (Q1) 31 is a minimum (step S5), and outputs a value for a time ratio corresponding to the minimum ON width (min Won) to the central processing unit 41 for the power supplyunit 3 (step S6). The central processing unit 41 outputs a pulse signal received from the personal computer 51 to the pulse width modulator 35 to operate the switching transistor 31. Then, the personal computer 51 reads in an output voltage (Vout) from the voltage sensor (DET4) 53 and determines whether the detected value coincides with a target value, for example, with a driving voltage for an actual device such as a notebook personal computer or not (step S7).

If it is determined that the output voltage (Vout) for the power supply unit 3 does not reach the target value, the personal computer 51 makes the ON width (Won) of the pulse signal wider step by step (step S8), and outputs a value for a time ratio corresponding to the width to the central processing unit 41 for the power supply unit 3 (step S6). The personal computer 51 repeatedly executes the processing from step S6 to step S8 until the output voltage (Vout) for the power supply unit 3 reaches the target value, and stores a value for a time ratio corresponding to the ON width (Won) for the pulse signal at the point of time when the value reaches the target value in the table 48 (step S9).

Then, the personal computer 51 determines whether a load current (Iout1) coincides with a maximum value (max Iout1) having been preset or not (step S10). If it is determined that the load current does not coincide with the maximum value, the personal computer 51 executes processing for making the load current (Iout1) a little larger (step S11), making again the ON width (Won) of the pulse signal wider from the minimum ON width (min Won) step by step in a state where the load current is made larger, obtaining a time ratio when the output voltage (Vout) for the power supply unit 3 coincides with the target value, and storing the time ratio in the table 48 (step S4 to step S10). The personal computer 51 repeatedly executes this serial processing until the load current (Iout1) reaches the maximum value (max Iout1) while the load current (Iout1) is made larger step by step (step S4 to step S11).

When it is determined in step S10 that the load current (Iout1) coincides with the maximum value (max Iout1), the personal computer 51 determines whether the peripheral temperature (Ta) coincides with the preset maximum value (max Ta) or not (step S12). If it is determined that the peripheral temperature does not coincide with the maximum value, the personal computer 51 repeatedly executes processing for making the peripheral temperature (Ta) a little higher (step S13), returning the load current (Iout1) to the minimum value (min Iout1) and making again the ON width (Won) for the pulse signal wider step by step from the minimum ON width (min Won), obtaining a time ratio when the output voltage (Vout) for the power supply unit 3 coincides with the target value, and storing the time ratio in the table 48 until the load current (Iout1) reaches the maximum value (max Iout1) while the load current (Iout1) is made larger step by step (step S3 to step S11).

The personal computer 51 repeatedly executes this serial processing until the peripheral temperature (Ta) reaches the maximum value (max Ta) while the peripheral temperature (Ta) is made higher step by step (step S3 to step S13).

When it is determined in step S12 that the peripheral temperature (Ta) coincides with the maximum value (max Ta), the personal computer 51 determines whether the input voltage (Vin) coincides with the preset maximum value (max Vin) or not (step S14). If it is determined that the input voltage does not coincide with the maximum value, the personal computer 51 repeatedly executes processing for making the input voltage (Vin) a little larger (step S15), returning the peripheral temperature (Ta) as well as the load current (Iout1) to the minimum values (min Ta) and (min Iout1) respectively, making again the ON width (Won) for the pulse signal wider step by step from the minimum ON width (min Won), obtaining a time ratio when the output voltage (Vout) for the power supply unit 3 coincides with the target value, and storing the time ratio in the table 48 until the load current (Iout1) reaches the maximum value (max Iout1) while the load current (Iout1) is made larger step by step, and further repeatedly executes this serial processing until the peripheral temperature (Ta) reaches the maximum value (max Ta) while the peripheral temperature (Ta) is made higher step by step (step S2 to step S13).

The personal computer 51 repeatedly executes the above serial processing until the input voltage (Vin) reaches the maximum value (max Vin) while the input voltage (Vin) is made larger step by step (step S2 to step S15).

When it is determined in step S14 that the input voltage (Vin) coincides with the maximum value (max Vin), values for all of the time ratios for the table 48 are obtained, and then the personal computer 51 stores the table 48 in the memory 49 (step S16) and ends the processing for table preparation.

Figure 6:
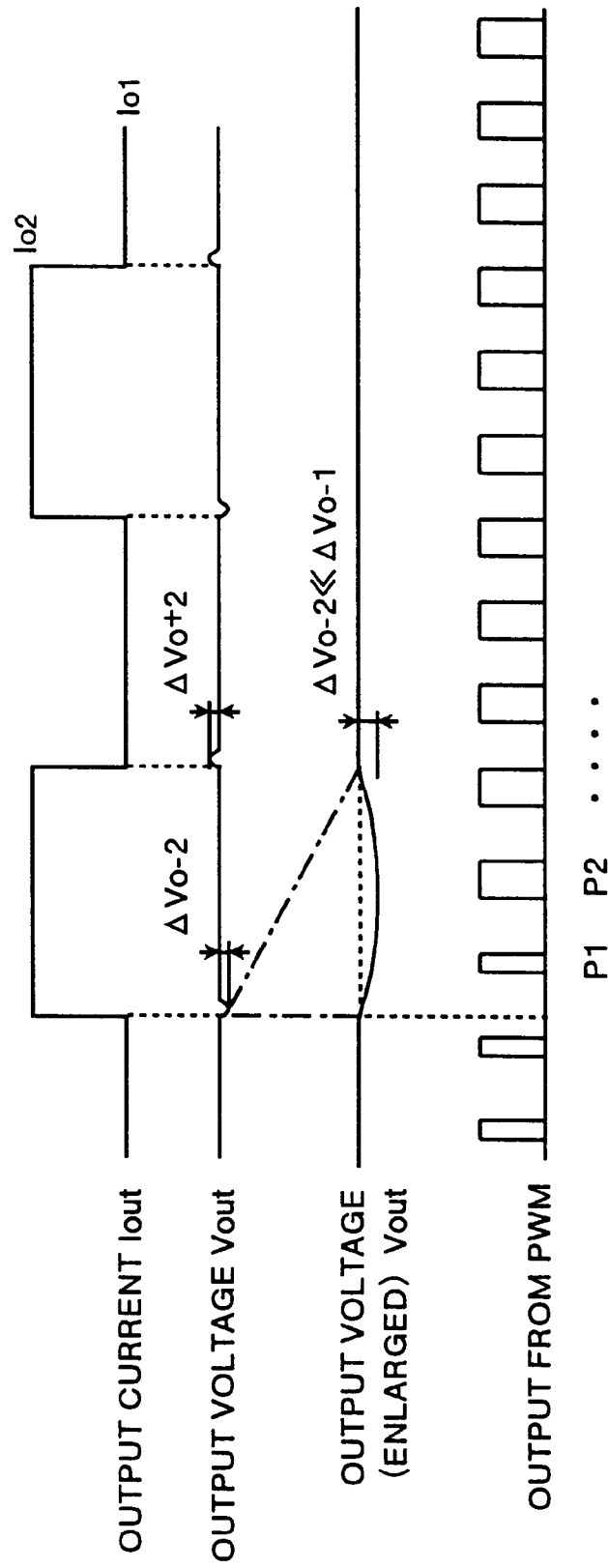
FIG. 6 is a timing chart showing one example of an operational timing in Embodiment 1 of the switching power supply unit according to the present invention.

FIG. 6 shows a timing chart indicating an operational timing for the switching power supply unit 3 having the configuration described above. As shown in the figure, for example, when the CMOS circuit (not shown in the figure) constituting the load 22 does not operate, an output current (Iout) for the power supply unit 3 is Io1, and when the CMOS circuit (not shown in the figure) operates, on the other hand, the output current (Iout) increases to be Io2.

In this case, each output voltage for the power supply unit 3 is changed at the moment at which the output current (Iout) is changed from Io1 to Io2 as well as at the moment at which the output current (Iout) is returned from Io2 to Io1. The switching power supply unit 3 according to this embodiment selects a time ratio for an ON time of the switching transistor 31 from the table 48 according to, for instance, the change of the output current (Iout) and turns ON/OFF the switching transistor 31, so that, for example, if the output current (Iout) increases from Io1 to Io2, it is understood that a pulse width for a first pulse P1 from the moment at which the output current (Iout) outputted from the pulse width modulator 35 is changed is not sufficiently wide enough for the value corresponding to the increase of the output current (Iout), but that a pulse width for a second pulse P2 is sufficiently wide enough for the value corresponding to the increase of the output current (Iout).

Figure 10:
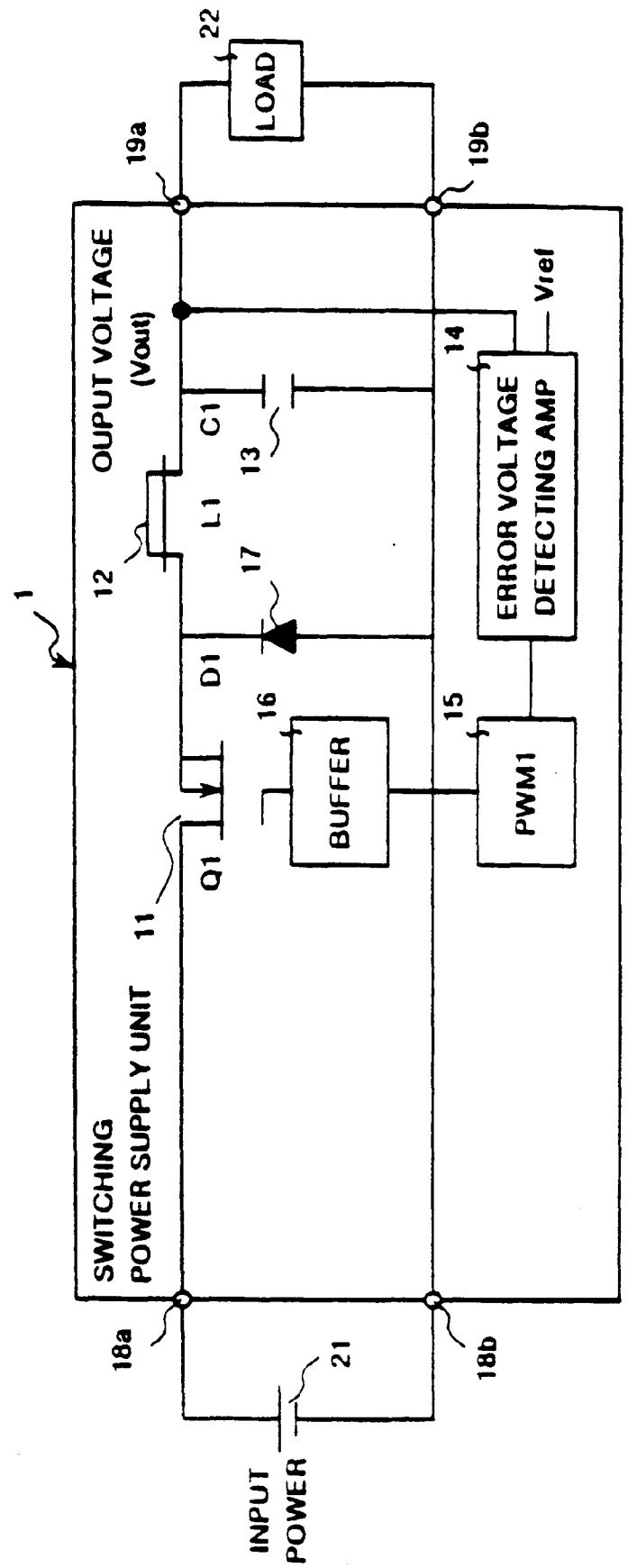
FIG. 10 is a block diagram showing the conventional type of switching power supply unit.
Figure 11:
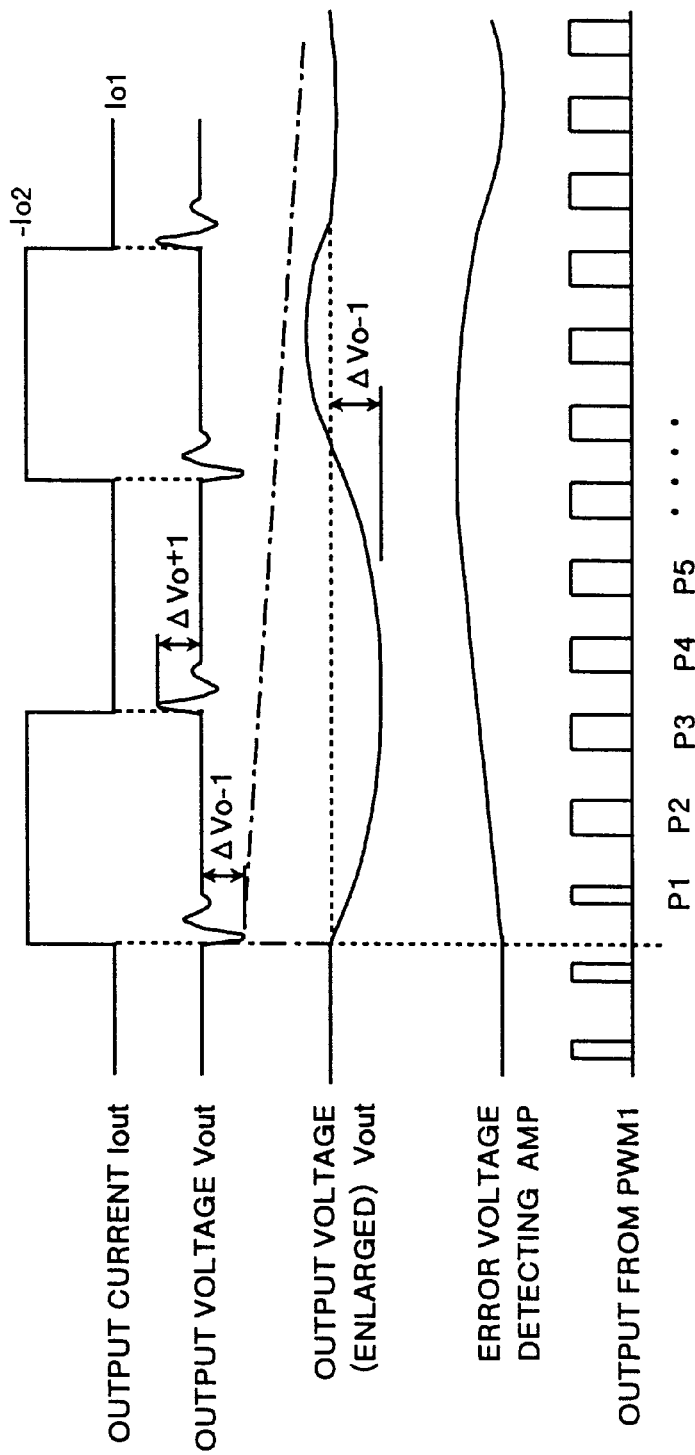
FIG. 11 is a timing chart showing an operational timing in the conventional type of switching power supply unit.

In contrast, the conventional type of switching power supply unit 1 shown in FIG. 10 detects a change of the output voltage (Vout) and executes feedback control thereto, so that the responsibility is not good, and a fifth pulse P5 from the moment at which the output current (Iout) is changed as shown in FIG. 11 finally obtains a pulse width corresponding to the increase of the output current (Iout). Namely, the switching power supply unit 3 according to this embodiment can return, when an output voltage (Vout) is changed, the output voltage (Vout) to the default more rapidly than that of the conventional technology. In addition, a change rate of an output voltage (Vout) for the switching power supply unit 3 according to the embodiment is Δ Vo-2, which is remarkably smaller than the change rate Δ Vo-1 of an output voltage (Vout) for the conventional type of switching power supply unit 1 shown in FIG. 11.

With the switching power supply unit 3 according to Embodiment 1, by referring to an input voltage (Vin) detected by the voltage sensor (DET1) 42 for detecting an input voltage, an output current (Iout) detected by the current sensor (DET2) 43 for detecting an output current and a peripheral temperature (Ta) detected by the temperature sensor (DET3) 44 for detecting a peripheral temperature, and to the table 48 storing therein information concerning a relation between those detected values and each time ratio of an ON time of the switching transistor (Q1), an ON time of the switching transistor (Q1) corresponding to the detected input voltage (Vin), output current (Iout) and the peripheral temperature (Ta) is selectively decided, so that an ON time of the switching transistor (Q1) can accurately be controlled before an output voltage (Vout) is changed, and for this reason, the change of the output voltage (Vout) can be suppressed to a minimum and also an output voltage (Vout) can be maintained at a specified value.

Also, with the switching power supply unit 3 according to Embodiment 1, the feedback loop is not necessarily provided therein, so that high-speed control for an output voltage can be achieved up to a response speed of a filter circuit by making shorter sampling cycles of the input voltage (Vin) detected by the voltage sensor (DET1) 42 for detecting an input voltage as well as of the output current (Iout) detected by the current sensor (DET2) 43 for detecting an output current, and for this reason, a rapid response for controlling an output voltage for the switching power supply unit 3 can be realized together with speed-up of an analog to digital (A/D) converter as well as of a computer or the like, and in addition, a large number of capacitors are not necessarily provided as are required in the case where the conventional type of feedback control is used, which enables minimization and weight reduction of the power supply unit 3.

Further, with the table preparing system and table preparing method according to Embodiment 1, the table 48 can automatically prepared with an externally connected personal computer 51, and for this reason efforts and a time required for preparing the table can be reduced.

Figure 7:
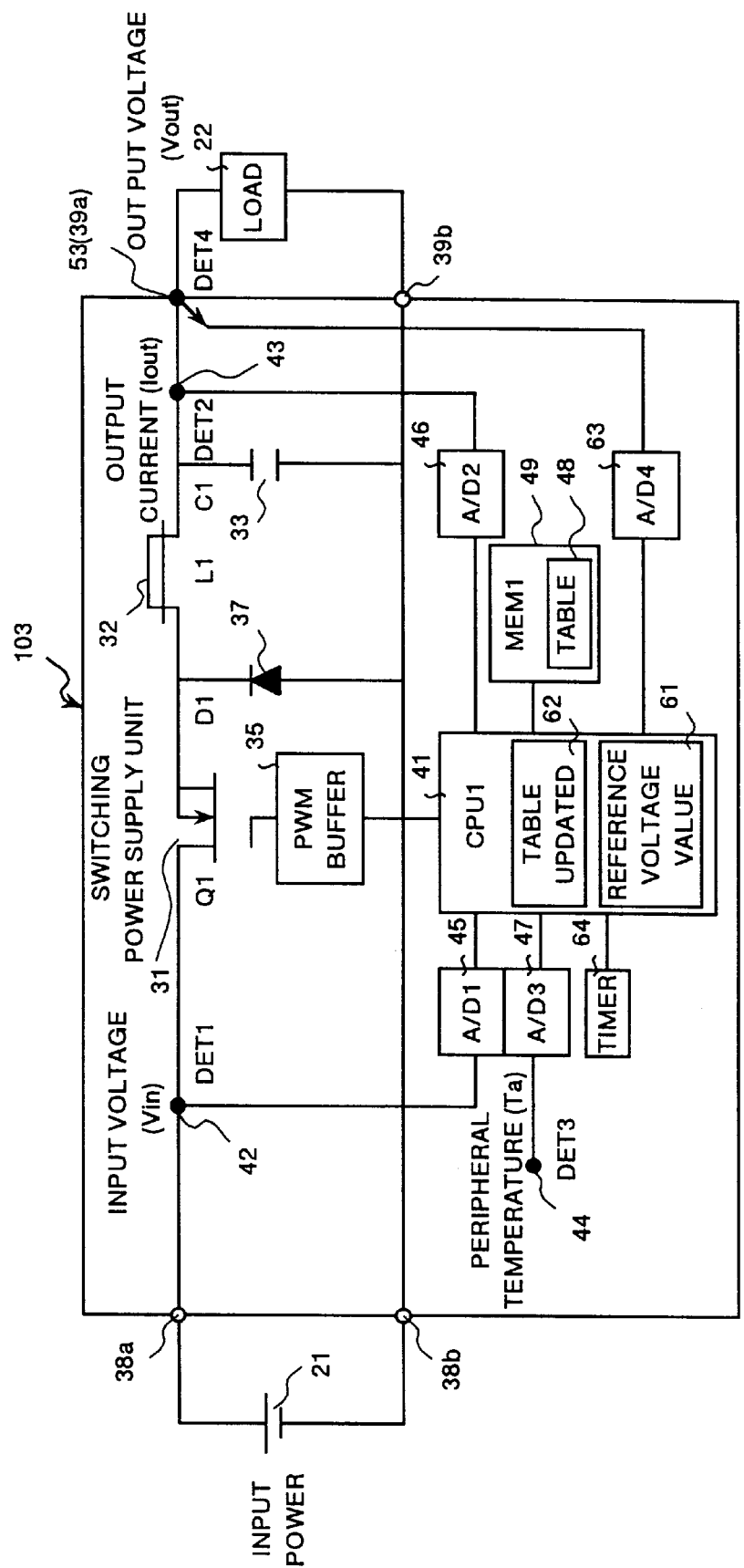
FIG. 7 is a block diagram showing Embodiment 2 of the switching power supply unit according to the present invention.

FIG. 7 shows other configuration of the switching power supply unit according to the present invention. The switching power supply unit 103 shown in FIG. 7 has some points different from the switching power supply unit 3 shown in FIG. 1 in which a reference voltage value (Vref) as a reference of an output voltage for the power supply unit 103 is stored in an internal non-volatile memory 61 of the central processing unit (CPU1) 41, the central processing unit 41 has a table updating section 62 for updating the table 48 in the memory 49, a voltage sensor (DET4) 53 for detecting an output voltage (Vout) for the power supply unit 103 is provided therein, an analog to digital converter (A/D4) 63 for converting a detected value (analog information) by the voltage sensor (DET4) 53 to digital information is provided therein and a timer section 64 for sending an interruption signal to the central processing unit for each specified period of time is provided therein.

Then, in the switching power supply unit 103 shown in FIG. 7, the table updating section 62 for the central processing unit 41 executes, when an interruption signal sent from the timer section 64 is received, an interruption program for updating the table. This table updating program is stored in an internal memory (e.g. internal memory 61) of the central processing unit 41 or in an external memory (e.g. memory 49) connected to the central processing unit 41.

The table updating section 62 reads in, when the table updating program is started up, detected values for an input voltage value (Vin), an output current (Iout) and a peripheral temperature from the voltage sensor (DET1) 42 for detecting an input voltage, current sensor (DET2) 43 for detecting an output current, and the temperature sensor (DET3) 44 for detecting a peripheral temperature respectively, selects a time ratio corresponding to a combination of those detected values from the table 48, and provides controls for ON/OFF of the switching transistor (Q1) 31 according to the time ratio.

Then, the table updating section 62 reads in a detected value for an actual output voltage (Vout) from the voltage sensor (DET4) for detecting an output voltage, compares the detected value to the reference voltage value, and changes the time ratio of the switching transistor (Q1) when there is any difference between both of the values so that a difference therebetween will be zero. Then the table 48 is updated according to a correction rate to the time ratio at that time. It should be noted that this feedback control may be executed, for instance, once in every hour, once in every day, or once in every month, which does not compromise a rapid response of the switching power supply unit 103.

When the feedback control is executed, if the table 48 is stored in an electrically erasable/rewritable read-only memory such as an EEPROM or what is called a flash memory, or in a non-volatile memory such as SRAM (Static RAM) backed up by a battery, the table 48 itself may be rewritten with new time ratios by using a correction rate to the time ratios obtained by executing the interruption program for the table updating section 62.

If the table 48 is stored in a non-rewritable memory such as a mask ROM, on the other hand, a correction rate to each time ratio stored in the original table 48 is computed to be obtained by using a correction rate to each time ratio obtained by executing the interruption program for the table updating section 62, a corrected table storing therein a correction rate to each of the obtained time ratios is prepared anew, an equation for correction is generated, so that those corrected table or equation for correction may be stored in a non-volatile memory or the like.

It should be noted that other configuration, functions and operational timing or the like for the switching power supply unit 103 according to Embodiment 2 are the same as those in Embodiment 1, so that detailed description thereof is omitted herein.

With the switching power supply unit 103 according to Embodiment 2, similarly to Embodiment 1 shown in FIG. 1, an ON time of the switching transistor (Q1) can accurately be controlled before an output voltage (Vout) is changed, and for this reason, the change of the output voltage (Vout) can be suppressed to a minimum, an output voltage (Vout) can he maintained at a specified value, a rapid response for controlling an output voltage for the switching power supply unit 103 can be realized, and further minimization and weight reduction of the power supply unit 103 can be achieved.

Also, with the switching power supply unit 103 according to Embodiment 2, the table 48 can be updated, so that the characteristic of the power supply unit 103 can be prevented from being inapplicable to the table 48 due to nonuniformity in manufacturing of the power supply unit 103 or deterioration thereof with time, and for this reason the optimal control can always be provided.

Figure 8:
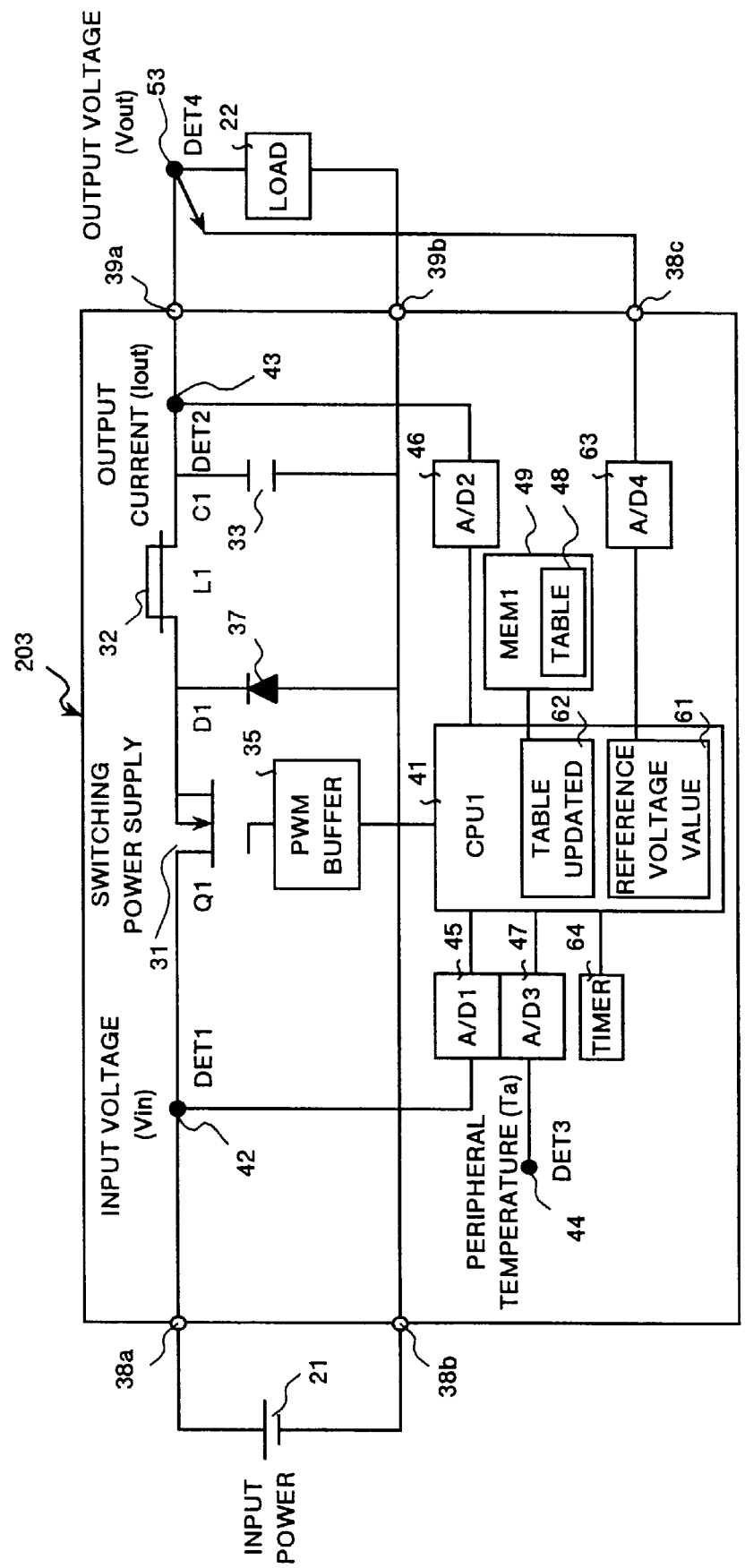
FIG. 8 is a block diagram showing other example in Embodiment 2 of the switching power supply unit according to the present invention.

It should be noted that, as the example shown in FIG. 8, the voltage sensor (DET4) 53 for detecting an output voltage is provided at an input terminal for the external load 22, and a value detected by the voltage sensor (DET4) 53 may be fetched into a switching power supply unit 203 via the third input terminal 38c. If the detected value is fetched thereinto, the table 48 including a voltage drop due to the wiring or the like between the switching power supply unit 203 and the load 22 is updated, so that the characteristic of the power supply unit 203 can be prevented from being inapplicable to the table 48 due to nonuniformity in manufacturing of the power supply unit 203 as well as of the load 22 or deterioration thereof with time, and for this reason the optimal control can always be provided.

Figure 9:
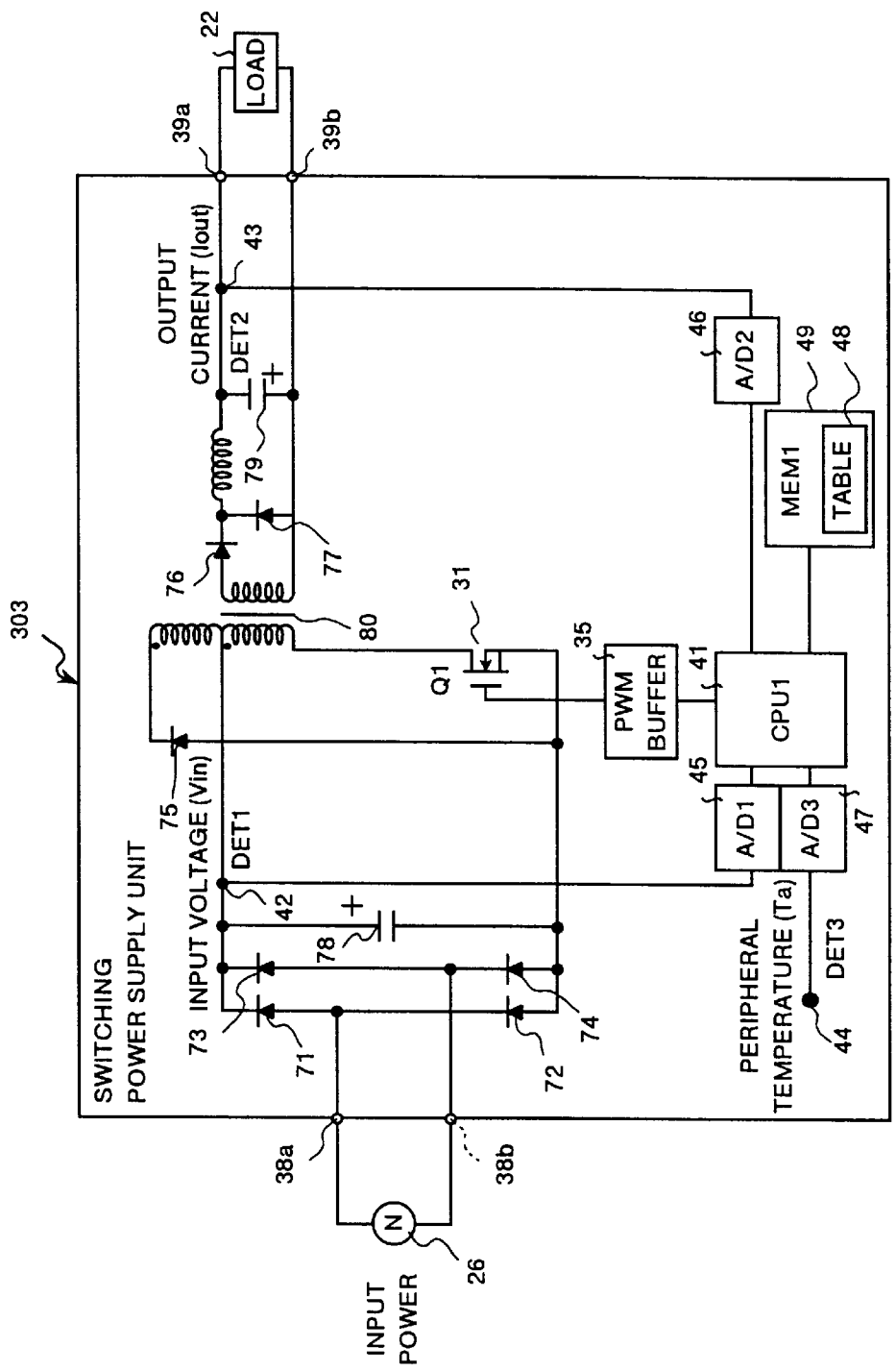
FIG. 9 is a block diagram showing Embodiment 3 of the switching power supply unit according to the present invention.

FIG. 9 shows other configuration of the switching power supply unit according to the present invention. The switching power supply unit 303 shown in FIG. 9 has some points different from the switching power supply unit 3 shown in FIG. 1 in which an input power 26 is an AC power and the inputted AC power is converted to a DC power for a specified voltage to be outputted. This switching power supply unit 303 is applicable to a comparatively larger-type of power supply unit.

In the figure, designated at the reference numerals 71, 72, 73, 74, 75, 76, 77 are diodes respectively, at 78, 79 capacitors respectively, and at 80 a transformer. It should be noted that other configuration, functions and operational timing or the like for the switching power supply unit 303 are the same as those in Embodiment 1, so that detailed description thereof is omitted herein.

With the switching power supply unit 303 according to Embodiment 3, similarly to Embodiment 1 shown in FIG. 1, an ON time of the switching transistor (Q1) can accurately be controlled before an output voltage (Vout) is changed, and for this reason, the change of the output voltage (Vout) can be suppressed to a minimum, an output voltage (Vout) can be maintained at a specified value, and also a rapid response for controlling an output voltage for the switching power supply unit 303 can be realized.

It should be noted that it is believed obvious that modification and variation of the present invention are possible in addition to the embodiments described above. For example, in the embodiments, ON/OFF control for the switching transistor (Q1) 31 is executed with the pulse width modulation system, but the system is not restricted only to the above system, and ON/OFF control may be executed with, for instance, a frequency modulation system.

The switching transistor (Q1) 31 is used as a switching unit in the embodiment, but the switching unit is not restricted thereto, and other switching element may be used. If the switching transistor (Q1) 31 is used, minimization and weight reduction of the switching unit can be achieved, accordingly, minimization and weight reduction of the entire power supply unit can be achieved, and reliability can be improved with a non-contact system of a switch, which is preferable.

Further, in the embodiment, the table 48 is stored in the external memory 49, but the memory is not restricted thereto, and the table 48 may be stored in an internal memory for the central processing unit (CPU1).

As described above, with the invention according to claim 1, by referring to an input voltage detected by an input voltage detecting unit as well as to a previously prepared table, an ON time or an OFF time of a switching unit corresponding to the detected input voltage is selectively decided, so that an ON time or an OFF time of the switching unit can accurately be controlled before an output voltage is changed, and for this reason, the change of the output voltage can be suppressed to a minimum.

In addition, with the switching power supply unit according to the present invention, a feedback loop does not need to be provided therein, so that high-speed control for an output voltage can be achieved as far as a response speed of a filter circuit by making shorter a sampling cycle of the input voltage detected by the input voltage detecting unit, and for this reason, a rapid response for controlling an output voltage for a power supply unit can be realized together with speed-up of an analog to digital (A/D) converter as well as of a computer or the like, and in addition, a large number of capacitors are not necessarily provided, which enables minimization and weight reduction of a power supply unit.

With the switching power supply unit according to the present invention, by referring to an output current detected by an output current detecting unit as well as to the previously prepared table, an ON time or an OFF time of a switching unit corresponding to the detected output current is selectively decided, so that an ON time or an OFF time of the switching unit can accurately be controlled before an output voltage is changed, and for this reason, the change of the output voltage can be suppressed to a minimum.

In addition, with the switching power supply unit according to the present invention, a feedback loop does not need to be provided therein, so that high-speed control for an output voltage can be achieved as far as a response speed of a filter circuit by making shorter a sampling cycle of the output current detected by the output current detecting unit, and for this reason, a rapid response for controlling an output voltage for a power supply unit can be realized together with speed-up of an analog to digital (A/D) converter as well as of a computer or the like, and in addition, a large number of capacitors are not necessarily provided, which enables minimization and weight reduction of a power supply unit.

With the switching power supply unit according to the present invention, by referring to an input voltage detected by the input voltage detecting unit, an output current detected by the output current detecting unit and to the previously prepared table, an ON time or an OFF time of a switching unit corresponding to the detected input voltage as well as output current is selectively decided, so that an ON time or an OFF time of the switching unit can more accurately be controlled before an output voltage is changed, and for this reason, the change of the output voltage can be suppressed to a minimum and the output voltage can be maintained at a specified value.

In addition, with the switching power supply unit according to the present invention, a feedback loop does not need to be provided therein, so that high-speed control for an output voltage can be achieved as far as a response speed of a filter circuit by making shorter sampling cycles of the input voltage by the input voltage detecting unit as well as of the output current by the output current detecting unit, and for this reason, a rapid response for controlling an output voltage for a power supply unit can be realized together with speed-up of an analog to digital (A/D) converter as well as of a computer or the like, and in addition, a large number of capacitors are not necessarily provided, which enables minimization and weight reduction of a power supply unit.

With the switching power supply unit according to the present invention, by referring to an input voltage detected by the input voltage detecting unit, an output current detected by the output current detecting unit, a peripheral temperature detected by the peripheral temperature detecting unit and to the previously prepared table, an ON time or an OFF time of a switching unit corresponding to the detected input voltage, output current and peripheral temperature is selectively decided, so that an ON time or an OFF time of the switching unit can further more accurately be controlled before an output voltage is changed, and for this reason, the change of the output voltage can be suppressed to a minimum and the output voltage can be maintained at a specified value.

With the switching power supply unit according to the present invention, the table can be updated by comparing an actual output voltage value at an output terminal of the power supply unit detected by the output voltage detecting unit to a reference voltage value, so that the characteristic of a power supply unit can be prevented from being inapplicable to the table due to nonuniformity in manufacturing of the power supply unit or deterioration thereof with time.

With the switching power supply unit according to the present invention, the table can be updated including a voltage drop due to a wiring or the like from the output terminal of the power supply unit to an external load by comparing an actual output voltage value at an input terminal of the external load detected by the output voltage detecting unit to the reference voltage value, so that the characteristic of a power supply unit can be prevented from being inapplicable to the table due to nonuniformity in manufacturing of the power supply unit or deterioration thereof with time.

With the switching power supply unit according to the present invention, a time is counted and the table can be updated once for every specified period of time, so that the characteristic of a power supply unit can be prevented from being inapplicable to the table due to nonuniformity in manufacturing of the power supply unit or deterioration thereof with time.

With the switching power supply unit according to the present invention, a switching unit can be controlled with a value obtained by correcting the value stored in the table by using the original table stored in a read-only memory as well as a corrected table, so that the optimal control can always be provided.

With the switching power supply unit according to the present invention, the switching unit can be controlled by using the latest table always updated, so that the optimal control can always be provided.

With the switching power supply unit according to the present invention, an input voltage is switched according to ON/OFF of a switching transistor, so that minimization as well as weight reduction of an entire power supply unit with minimization as well as weight reduction of a switching unit and reliability with a non-contact system of the switch can be improved.

With the switching power supply unit according to the present invention, processing for selecting a corresponding ON time or OFF time from the table is executed by a processing unit, and a pulse signal for controlling the switching unit is generated by a pulse generating unit according to the selected ON time or OFF time, so that a processing unit comprising a unit such as a CPU (Central Processing Unit) can speedily select a corresponding ON time or OFF time from a table, and for this reason a switching unit can speedily be controlled.

With the switching power supply unit according to the present invention, a switching operation of the switching unit is controlled by changing a pulse width of a pulse signal, so that a switching operation can be controlled with the known pulse width modulation system.

With the switching power supply unit according to the present invention, a switching operation of the switching unit is controlled by changing a frequency of a pulse signal, so that a switching operation can be controlled with the known frequency modulation system.

With the switching power supply unit according to the present invention, a table can automatically be prepared by an external control unit, so that efforts and a time required for preparing a table can be reduced.

This application is based on Japanese patent application No. HEI 9-270056 filed in the Japanese Patent Office on Oct. 2, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A switching power supply unit, comprising:
    an input terminal and an output terminal;
    an input voltage detector to detect an input voltage at said input terminal;
    a switching unit to selectively connect said input terminal and said output terminal during an ON time and to selectively disconnect said input terminal from said output terminal during an OFF time;
    a storing unit having a table to store input voltage values and corresponding control information for switching said switching unit ON or OFF; and
    a controller to control the ON time or the OFF time of said switching unit with control information from said storing unit which corresponds to the input voltage value detected by said input voltage detector.

2. A switching power supply unit according to claim 1, further comprising:
    a peripheral temperature detector to detect a peripheral temperature,
    wherein the table of said storing unit stores peripheral temperatures and corresponding ON times and OFF times of said switching unit, and wherein said controller receives the peripheral temperature detected by said peripheral temperature detector and controls the ON time or the OFF time of said switching unit according to a corresponding ON time or OFF time from the table.

3. A switching power supply unit according to claim 1, further comprising:
    a table preparing unit to set at least one of an input voltage, an output current, and a peripheral temperature to a specified value, and to store control information corresponding to the ON time when an output voltage is set to a specified value in the table.

4. A switching power supply unit according to claim 1, further comprising:
    an output voltage detector to detect an output voltage value at said output terminal, wherein said storing unit stores a reference voltage value of an output voltage; and
    a table updating unit to update the table according to an output voltage value detected by said output voltage detector and the reference voltage value.

5. A switching power supply unit according to claim 4, further comprising a timer unit to specify periods of time, wherein said table updating unit updates the table once for every specified period of time.

6. A switching power supply unit according to claim 5, wherein the table is stored in a read-only memory, said table updating unit generates an equation for correction of the table or generates a corrected table, and said controller corrects a value in the table according to said equation for correction or said corrected table.

7. A switching power supply unit according to claim 5, wherein the table is stored in a non-volatile memory or an electrically erasable/rewritable read-only memory, and said table updating unit updates each value stored in the table to a new value.

8. A switching power supply unit according to claim 1, comprising:
    an output voltage detector to detect an output voltage value at said output terminal for a connected external load, wherein said storing unit stores a reference voltage value of an output voltage; and a table updating unit for updating the table according to an output voltage value detected by said output voltage detector and the stored reference voltage value.

9. A switching power supply unit according to claim 8, further comprising timer unit to specify periods of time, wherein said table updating unit updates the table once for every specified period of time.

10. A switching power supply unit according to claim 9, wherein the table is stored in a read-only memory, said table updating unit generates an equation for correction of the table or generates a corrected table, and said controller corrects a value in the table according to said equation for correction or said corrected table.

11. A switching power supply unit according to claim 9, wherein the table is stored in a non-volatile memory or an electrically erasable/rewritable read-only memory, and said table updating unit updates each value stored in the table to a new value.

12. A switching power supply unit according to claim 1, wherein said switching unit comprises a switching transistor.

13. A switching power supply unit according to claim 12, wherein said controller selects control information for said switching unit from the table, and prepares a pulse signal for controlling a switching operation of said switching unit according to said selected control information.

14. A switching power supply unit according to claim 13, wherein said controller changes a pulse width of a pulse signal for controlling a switching operation of said switching unit.

15. A switching power supply unit according to claim 13, wherein said controller changes a frequency of a pulse signal for controlling a switching operation of said switching unit.

16. A switching power supply unit comprising:
    an input terminal and an output terminal;
    a switching unit to selectively connect said input terminal and said output terminal during an ON time and to selectively disconnect said input terminal from said output terminal during an OFF time;
    an output current detector to detect a current value of an output current at said output terminal;
    a storing unit having a table to store input voltage values and corresponding control information for switching said switching unit ON or OFF; and
    a controller to control the ON time or the OFF time of said switching unit with control information from said storing unit which corresponds to the output current value detected by said output current detector.

17. A switching power supply unit according to claim 16, further comprising:
    a peripheral temperature detector to detect a peripheral temperature,
    wherein the table of said storing unit stores peripheral temperatures and corresponding ON times and OFF times of said switching unit, and wherein said controller receives the peripheral temperature detected by said peripheral temperature detector and controls the ON time or the OFF time of said switching unit according to a corresponding ON time or OFF time from the table.

18. A switching power supply unit according to claim 16, further comprising:
    a table preparing unit to set at least one of an input voltage, an output current, and a peripheral temperature to a specified value, and to store control information corresponding to the ON time when an output voltage is set to a specified value in the table.

19. A switching power supply unit according to claim 16, further comprising:

an output voltage detector to detect an output voltage value at said output terminal, wherein said storing unit stores a reference voltage value of an output voltage; and
a table updating unit to update the table according to an output voltage value detected by said output voltage detector and the reference voltage value.

20. A switching power supply unit according to claim 19, further comprising a timer unit to specify periods of time, wherein said table updating unit updates the table once for every specified period of time.

21. A switching power supply unit according to claim 20, wherein the table is stored in a read-only memory, said table updating unit generates an equation for correction of the table or generates a corrected table, and said controller corrects a value in the table according to said equation for correction or said corrected table.

22. A switching power supply unit according to claim 20, wherein the table is stored in a non-volatile memory or an electrically erasable/rewritable read-only memory, and said table updating unit updates each value stored in the table to a new value.

23. A switching power supply unit according to claim 16, further comprising:
    an output voltage detector to detect an output voltage value at said output terminal, wherein said storing unit stores a reference voltage value of an output voltage; and
    a table updating unit to update the table according to an output voltage value detected by said output voltage detector and the reference voltage value.

24. A switching power supply unit according to claim 23, further comprising a timer unit to specify periods of time, wherein said table updating unit updates the table once for every specified period of time.

25. A switching power supply unit according to claim 24, wherein the table is stored in a read-only memory, said table updating unit generates an equation for correction of the table or generates a corrected table, and said controller corrects a value in the table according to said equation for correction or said corrected table.

26. A switching power supply unit according to claim 24, wherein the table is stored in a non-volatile memory or an electrically erasable/rewritable read-only memory, and said table updating unit updates each value stored in the table to a new value.

27. A switching power supply unit according to claim 16, wherein said switching unit comprises a switching transistor.

28. A switching power supply unit according to claim 27, wherein said controller selects control information for said switching unit from the table, and prepares a pulse signal for controlling a switching operation of said switching unit according to said selected control information.

29. A switching power supply unit according to claim 28, wherein said controller changes a pulse width of a pulse signal for controlling a switching operation of said switching unit.

30. A switching power supply unit according to claim 28, wherein said controller changes a frequency of a pulse signal for controlling a switching operation of said switching unit.

31. A switching power supply unit comprising:
    an input terminal and an output terminal;
    an input voltage detector to detect a voltage value at said input terminal;
    an output current detector to detect an output current;
    a switching unit to selectively connect said input terminal and said output terminal during an ON time and to selectively disconnect said input terminal from said output terminal during an OFF time;

a storing unit having a table to store input voltage values and corresponding control information for switching said switching unit ON or OFF; and a controller to control the ON time or the OFF time of said switching unit with control information from said storing unit which corresponds to the input voltage value detected by said input voltage detector, an output current value detected by said output current detector.

32. A switching power supply unit according to claim 31, further comprising:

a peripheral temperature detector to detect a peripheral temperature, wherein the table of said storing unit stores peripheral temperatures and corresponding ON times and OFF times of said switching unit, and wherein said controller receives the peripheral temperature detected by said peripheral temperature detector and controls the ON time or the OFF time of said switching unit according to a corresponding ON time or OFF time from the table.

33. A switching power supply unit according to claim 31 further comprising:

a table preparing unit for setting at least one of an input voltage, an output current, and a peripheral temperature to a specified value, and to store control information corresponding to the ON time when an output voltage is set to a specified value in the table.

34. A switching power supply unit according to claim 31, further comprising:

an output voltage detector to detect an output voltage value at said output terminal, wherein said storing unit stores a reference voltage value of an output voltage; and a table updating unit to update the table according to an output voltage value detected by said output voltage detector and the reference voltage value.

35. A switching power supply unit according to claim 34, further comprising a timer unit to specify periods of time, wherein said table updating unit updates the table once for every specified period of time.

36. A switching power supply unit according to claim 35, wherein the table is stored in a read-only memory, said table updating unit generates an equation for correction of the table or a corrected table, and said controller corrects a value in the table according to said equation for correction or said corrected table.

37. A switching power supply unit according to claim 35, wherein the table is stored in a non-volatile memory or an electrically erasable/rewritable read-only memory, and said table updating unit updates each value stored in the table to a new value.

38. A switching power supply unit according to claim 31 comprising:

an output voltage detector for detecting a voltage value at an input terminal for an external load connected to said output terminal;

a storing unit with a reference voltage value as a reference for an output voltage stored therein; and a table updating unit for updating the table according to an output voltage value detected by said output voltage detector as well as to said reference voltage value.

39. A switching power supply unit according to claim 38 having a timer unit for counting a time, wherein said table updating unit updates the table once for every specified period of time.

40. A switching power supply unit according to claim 39, wherein the table is stored in a read-only memory, said table updating unit generates an equation for correction of the table or generates a corrected table, and said controller corrects a value in the table according to said equation for correction or said corrected table.

41. A switching power supply unit according to claim 39, wherein the table is stored in a non-volatile memory or an electrically erasable/rewritable read-only memory, and said table updating unit updates each value stored in the table to a new value.

42. A switching power supply unit according to claim 31, wherein said switching unit comprises a switching transistor.

43. A switching power supply unit according to claim 42, wherein said controller selects control information for said switching unit from the table, and prepares a pulse signal to control a switching operation of said switching unit according to said selected control information.

44. A switching power supply unit according to claim 43, wherein said controller changes a pulse width of a pulse signal to control a switching operation of said switching unit.

45. A switching power supply unit according to claim 43, wherein said controller changes a frequency of a pulse signal to control a switching operation of said switching unit.

* * * * *